United States Patent Office 3,784,546
Patented Jan. 8, 1974

3,784,546
O(2-DIETHYLAMINO - 4-METHYL-6-PRIMIDINYL) O,O-DIMETHYL PHOSPHOROTHIOATE AND ITS SALTS
Stuart Peter Sharpe and Brian Kenneth Snell, Bracknell, England, assignors to Imperial Chemical Industries Limited, London, England
No Drawing. Original application Sept. 9, 1968, Ser. No. 758,579, now Patent No. 3,651,224. Divided and this application Sept. 30, 1971, Ser. No. 185,346
Claims priority, application Great Britain, Sept. 21, 1967, 43,133/67
Int. Cl. C07d 51/36
U.S. Cl. 260—256.5 R          4 Claims

ABSTRACT OF THE DISCLOSURE

O(2-diethylamino-4-methyl - 6 - pyrimidinyl)O,O - dimethyl phosphorothioate. This compound has pesticidal properties and is characterized by its extremely low toxicity to mammals. Pesticidal compositions and methods of using the same to combat pests are also disclosed. The acid addition salts of the indicated compound may also be used.

---

This is a division of application Ser. No. 758,579, Sept. 9, 1968, now U.S. Pat. No. 3,651,224.

This invention relates to a pesticidal pyrimidine derivative.

In our prior British Pat. No. 1,019,227 we have described and claimed pyrimidine derivatives of the formula:

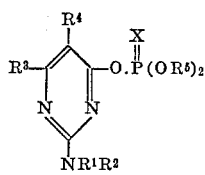

wherein $R^1$, $R^2$, and $R^5$, which may be the same or different, stand for alkyl or alkenyl radicals of not more than 6 carbon atoms, or wherein $R^1$ and $R^2$ together with the adjacent nitrogen atom form a heterocyclic radical, wherein $R^3$ and $R^4$ stand for hydrogen or an alkyl or alkenyl radical of not more than 6 carbon atoms, and wherein X stands for the oxygen or sulphur atom. These pyrimidine derivatives have insecticidal and fungicidal properties.

According to the present invention we provide a new pyrimidine derivative; viz: O(2-diethylamino-4-methyl-6-pyrimidinyl)O,O-dimethyl phosphorothioate. This compound has the formula:

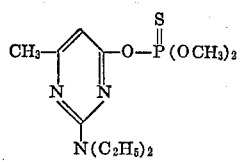

The above compound is new. It is distinquished from other compounds of the general formula disclosed in B. Pat. 1,019,227 by a remarkably low oral toxicity to mammals. It has an acute oral L.D. 50 to female rats of 2,250 mg./kg.; it is thus an order of magnitude less toxic than other closely similar pyrimidine derivatives. By way of example, the toxicities of two known insecticides of similar chemical structure are given below:

| Common Name | Structure | Acute oral L.D. 50 (rats), mg./kg. |
|---|---|---|
| Diazinon | 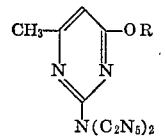 | 110 |
| Pyrimithate | 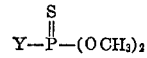 | 125 |

According to a further feature of the invention we provide a process for the manufacture of the said pyrimidine derivative which comprises reacting a compound of the formula:

$$CH_3-\underset{N(C_2N_5)_2}{\text{pyrimidine}}-OR$$

wherein R is hydrogen or an alkali metal atom, with a halogen derivative of the formula:

$$Y-\overset{S}{\underset{\|}{P}}-(OCH_3)_2$$

wherein Y is a halogen atom.

When R stands for an alkali metal atom, it may be, for example, a sodium or potassium atom. Conveniently Y is, for example, a chlorine or bromine atom.

In the case where R is hydrogen, the staring compound is conveniently first converted to the corresponding alkali metal derivative, for example by reaction with a solution of sodium in ethanol, or the interaction is carried out in the presence of an acid-binding agent, for example an alkali metal salt of a weak acid, for example an alkali metal carbonate, for example potassium carbonate, or a tertiary organic base, for example a trialkylamine of not more than 12 carbon atoms, for example an N,N-dialkylarylamine of not more than 12 carbon atoms, for example N,N-dimethylaniline.

The interaction may conveniently be carried out in an inert diluent or solvent, for example ethyl acetate or benzene, and it may be accelerated or completed by the application of heat.

The pyrimidine derivative of the invention may be used, if desired, in the form of its acid addition salts. These may be made by reacting it with an equivalent amount of an acid, for example a mineral acid. Examples of suitable acids are the hydrogen halides, nitric acid and phosphoric acid. Preferably dilute acids are used.

The pyrimidine derivative of the invention, possesses particularly useful insecticidal properties. It also has fungicidal properties.

According to a further feature of the invention therefore, we provide biologically active compositions comprising the said pyrimidine derivative, in admixture with a diluent or carrier therefor.

The compositions may be used for agricultural, horticultural or veterinary purposes and the type of composition used in any instance will depend upon the particular purpose for which it is to be used.

The compositions may be in the form of dusting powders wherein the active ingerdient is mixed with a solid diluent or carrier. Suitable solid diluents or carriers may be, for example, kaolin, bentonite, kieselguhr, dolomite, calcium carbonate, talc, powdered magnesia, fuller's earth, gypsum, Hewitt's earth, diatomaceous earth and china clay.

The compositions may also be in the form of liquid preparations to be used as dips or sprays which are generally aqueous dispersions or emulsions containing the active ingredient in the presence of one or more wetting agents, dispersing agents, emulsifying agents or suspending agents.

Wetting agents, dispersing agents and emulsifying agents may be of the cationic, anion or non-ionic type. Suitable agents of the cationic type include, for example, quaternary ammonium compounds, for example, cetyltrimethylammonium bromide. Suitable agents of the anionic type include, for example, soaps, salts of aliphatic mono-esters of sulphuric acid, for example sodium lauryl sulphate, salts of sulphonated aromatic compounds, for example sodium dodecylbenzenesulphonate, sodium, calcium or ammonium lignosulphonate, butylnaphthalene sulphonate, and a mixture of the sodium salts of diisopropyl- and triisopropyl-naphthalene sulphonic acids. Suitable agents of the non-ionic type include, for example, the condensation products of ethylene oxide with fatty alcohols such as oleyl alcohol, or with alkyl phenols such as octylphenol, nonylphenol and octylcresol. Other nonionic agents are the partial esters derived from long chain fatty acids and hexitol anhydrides, the condensation products of the said partial esters with ethylene oxide, and the lecithins. Suitable suspending agents are, for example, hydrophilic colloids, for example polyvinylpyrrolidone and sodium carboxymethylcellulose, and the vegetable gums, for example gum acacia and gum tragacanth.

The aqueous dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are isopropyl alcohol, propylene glycol, diacetone alcohol, toluene, kerosene, methylnaphthalene, xylenes and trichloroethylene.

The compositions to be used as sprays may also be in the form of aerosols wherein the formulation is held in a container under pressure in the presence of a propellant such as fluorotrichloromethane or dichlorodifluoromethane.

By the inclusions of suitable additives for example for improving the distribution, adhesive power and resistance to rain on treated surfaces, the different compositions can be better adapted for the various uses for which they are intended.

The compositions which are to be used in the form of aqueous dispersions or emulsions are generally supplied in the form of a concentrate containing a high proportion of the active ingredient or ingredients, the said concentrate to be diluted with water before use. These concentrates are often required to withstand dilution with water in order to form aqueous preparations which remain homogeneous for a sufficient time to enable them to be applied by conventional spray equipment. The concentrates may contain from 10–85% by weight of the active ingredient or ingredients. When diluted to form aqueous preparations, such preparations may contain varying amounts of the active ingredient or ingredients depending upon the purpose for which they are to be used.

For agricultural or horticultural purposes, an aqueous preparation containing between 0.001% and 0.1% by weight of the active ingredient or ingredients may be used.

Compositions of the invention may be stabilized by the incorporation therein of stabilizing agents, for example epichlorohydrin. They may be mixed if desired with other crop protection products.

According to a further feature of the invention we provide a method of combatting insect pests which comprises applying to the pests or their habitat a pesticidal amount of the pyrimidine derivative of the invention.

The compound and compositions of the present invention exert considerable toxicity towards a wide variety of insect pests, including, besides those illustrated in the examples, *Lucilia sericata* (blowfly) and *Pieris brassicae* and also soil pests including flies, beetles and *Meloidogyne incognita* (nematodes).

They are also effective against various plant fungal diseases, notably rice blast (*Piricularia oryzae*).

The invention is illustrated by the following examples:

EXAMPLE 1

The compound O(2 - diethylamino-4-methyl-6-pyrimidinyl)O,O-dimethyl phosphorothiote was prepared as follows:

2-diethylamino - 4 - methyl-6-hydroxy pyrimidine (0.06 mole) was mixed with 0.7 g. (0.07 mole) anhydrous potassium carbonate in ethyl acetate (130 ml.) and dimethyl chlorothiophosphate (0.06 mole) added slowly. The solution was refluxed overnight, cooled and evaporated to dryness under reduced pressure. The residue was then taken up into toluene, washed free of unreacted hydroxypyrimidine with cold 3% aqueous sodium hydroxide followed by water until the washings were neutral. After drying over anhydrous magnesium sulphate and removing the solvent the crude product was obtained. This was heated to 75° C. under a pressure 0.2 mm. mercury for two hours to remove unreacted chlorothiophosphate and a final yield of pure O(2-diethylamino-4-methyl-6-pyrimidinyl)O,O-dimethyl phosphorothioate obtained that was 80% of the theoretical yield $n_D^{24}=1.5291$.

EXAMPLE 2

The activity of the compounds prepared according to Example 1 was tested against a variety of insect pests. The compound was in each case used in the form of liquid preparations containing 1000, 500 or 125 parts per million by weight of the compound. The preparations were made by dissolving the compound in a mixture of solvents consisting of 4 parts by volume of acetone and 1 part by volume of diacetone alcohol. The solutions were then diluted with water containing 0.01% by weight of a wetting agent sold under the trade name "Lissapol" NX until the liquid preparations contained the required concentration of the compound. "Lissapol" is a registered trademark.

The test procedure adopted with regard to each test insect was basically the same and comprised supporting a number of the insects on a medium which was host plant or a foodstuff on which the insect feeds, and treating either or both the insect and the medium with the preparations.

The mortality of the insects was then assessed at periods usually varying from one to three days after the treatment.

The results of the test are given below in Table I. In this table the first column indicates the concentration of the compound in the test solution used. Each of the subsequent columns indicates the name of the test insect, the host plant or medium on which it was supported and the number of days which were allowed to elapse after the treatment before assessing the number of insects which had been killed. The assessment is expressed in integers which range from 0–4.

0 represents less than 30% kill
1 represents 30–49% kill
2 represents 50–90% kill
3 represents over 90% kill
4 represents over 100% kill

EXAMPLE 3

The compound prepared by the process of Example 1 was tested against mosquito larvae in comparison with diazinon. Test insects were placed in dilute solutions of the chemicals and the mortality rate assessed after 24 hours. Results are shown in Table 2 below.

EXAMPLE 5

The hydrogen oxalate salt of O(2-diethylamino-4-methyl-6-pyrimidinyl)O,O-dimethyl phosphorothioate was prepared as follows:

3.05 g. of the pyrimidine, 1.26 g. of oxalic acid dihydrate and 25 mls. of ethanol were placed in a 250 ml. conical flask and warmed on the steam bath till all the ethanol had evaporated. The residue was taken up in ethanol and subjected to the same drying procedure as was used in Example 4. The salt was left as a pale straw-colored oil which set to a glass on cooling.

The fluoroborate and p-toluene sulphonate salts were made by similar methods. They were obtained as viscous liquids which set to glasses on cooling.

TABLE I

| Concentration (p.p.m.) | Aedes aegypti Mosquito Water — | Aphis fabae Black aphid Broad bean 2 days | Megoura viciae Green aphid Broad bean 2 days | Tetranychus telarius Red spider mite French bean 3 days | Tetranychus telarius Red spider egg French bean 3 days | Dysdercus fasciatus Cotton strainer capsid Cotton 3 days | Plutella maculipennis Diamond-back moth caterpillar Cabbage/paper 2 days | Calandra granaria Grain weevil Wheat grain 3 days | Phaedon cochlearae Msutard beetle Mustard/paper 2 days | Musca domestica Housefly Milk and sugar cotton wool 1 day |
|---|---|---|---|---|---|---|---|---|---|---|
| ,000 | — | 4 | — | 4 | 4 | — | 4 | 4 | 4 | 4 |
| 00 | — | — | — | — | — | 4 | 4 | 4 | 4 | — |
| 25 | — | 4 | 4 | — | — | 4 | 4 | 4 | 4 | — |
| 0 | 4 | — | — | — | — | — | — | — | — | — |

NOTE.—In Tables 1 and 2 a dash indicates no test.

TABLE 2

| Concentration (p.p.m.) | Diazinon (percent kill) | Invention compound (percent kill) |
|---|---|---|
| 1.0 | 100 | — |
| 0.5 | 87 | — |
| 0.25 | 27 | — |
| 0.1 | 7 | 100 |
| 0.05 | 0 | — |
| 0.025 | — | 93 |
| 0.01 | — | 27 |
| 0.005 | — | 7 |
| 0.001 | — | 0 |
| 0 (Control) | 0 | 0 |

NOTE.—In tables 1 and 2 a dash indicates no test.

EXAMPLE 4

The hydrochloride of O(2-diethylamino-4-methyl-6-pyrimidinyl)O,O-dimethyl phosphorothioate was prepared as follows:

3.05 g. of the product of Example 1 were added to 10 mls. of N hydrochloric acid in a 250 ml. conical flask. This was warmed on the steam bath for 10 mins. with the addition of ethanol to homogenize the mixture. The solution was then striped on the rotary evaporator, taken up in absolute ethanol and stripped again, this process being repeated 4 times to remove water. The residual oil was heated by steam bath at about 100° C. for four hours under 0.05 mm. pressure to remove all traces of solvent. The pure salt was left as a very viscous straw-colored oil.

What is claimed is:

1. O(2-diethylamino-4-methyl - 6 - pyrimidinyl)O,O-dimethyl phosphorothioate.

2. A compound selected from the group consisting of O(2-diethylamino - 4 - methyl - 6 - pyrimidinyl)O,O-dimethyl phosphorothioate and a pesticidally effective acid addition salt therof.

3. A compound according to claim 2 wherein the acid-addition salt is the hydrochloride, the oxalate, the fluoroborate or the p-toluene sulphonate.

4. O(2-diethylamino - 4 - methyl-6-pyrimidinyl)O,O-dimethyl phosphorothioate hydrochloride.

References Cited

UNITED STATES PATENTS 3,651,224  3/1972  Sharpe et al. ____ 260—256.5 R
3,287,453  11/1966  McHattie _____ 260—256.4 G RICHARD J. GALLAGHER, Primary Examiner